US006758746B1

(12) United States Patent
Hunter et al.

(10) Patent No.: US 6,758,746 B1
(45) Date of Patent: Jul. 6, 2004

(54) METHOD FOR PROVIDING CUSTOMIZED INTERACTIVE ENTERTAINMENT OVER A COMMUNICATIONS NETWORK

(76) Inventors: Thomas C. Hunter, 12 Summit Ave., Salem, MA (US) 01970; Forest J. Handford, 18 Shadowbrook La. Unit 58, Milford, MA (US) 01757

( * ) Notice: Subject to any disclaimer, the term of this patent is extended or adjusted under 35 U.S.C. 154(b) by 236 days.

(21) Appl. No.: 10/054,649

(22) Filed: Oct. 26, 2001

(51) Int. Cl.$^7$ .................................................. A63F 13/00
(52) U.S. Cl. ............................................... 463/9; 463/29
(58) Field of Search ......................... 463/1, 29, 41–43, 463/48, 9; 705/1, 26, 37, 40

(56) References Cited

U.S. PATENT DOCUMENTS

| | | |
|---|---|---|
| 5,809,144 A | 9/1998 | Sirbu et al. |
| 5,885,156 A | 3/1999 | Toyohara et al. |
| 5,890,963 A | 4/1999 | Yen |
| 5,918,213 A | 6/1999 | Bernard et al. |
| 5,964,660 A | 10/1999 | James et al. |
| 5,970,143 A | 10/1999 | Schneier et al. |
| 6,009,458 A | 12/1999 | Hawkins et al. |
| 6,164,971 A | 12/2000 | Figart |
| 6,179,713 B1 | 1/2001 | James et al. |

OTHER PUBLICATIONS

Ultima Online Playguide Copyright 1999 Origin Systems Inc., 10 pages.*
Tom Faust, "Internet Service Providers," TCIGD.COM 1996–1997 KMAC Publications, Inc, 5 pages.*
Paul Palumbo, "Online Entertainment Business Models Accommodate Distinctive Experiences," Gamasutra, Nov. 21, 1997, vol. 1, Issue 18, CMP Media Inc., San Francisco, CA.
Ian Macinnes, "Internet Business Models: New Options for GAme Developers," Gamasutra, Jun. 5, 2000, CMP Media Inc., San Francisco, CA.
Craig Huber, "Next Generation MMORPGs: Economics 101," Multiplayer Online Games Directory, Oct. 10, 2000, MPOGD Inc., Wood River, IL.
Sandy Brundage, "PlayerAuctions.com—Safe Haven for MMORPG Players?," studentadvantage.com, Nov. 11, 2000, Student Advantage Inc., Boston, MA.
Mark Asher, "GameSpin: vol. 9," GameSpy.com, May 1, 2001, GameSpy Industries Inc., Irvine, CA.
Mark Asher, "Massive (Multiplayer) Entertainment," CG Online, Jul. 17, 2001, TheGlobe.Com Inc., New York, NY.

* cited by examiner

Primary Examiner—Jessica Harrison
Assistant Examiner—Robert E. Mosser
(74) Attorney, Agent, or Firm—Clock Tower Law Group; Erik J. Heels; Joshua D. Mather

(57) ABSTRACT

An invention creating a new method for providing customized interactive entertainment over a communications network. A method for selecting a player from a player database and for selecting a character with specific character attributes from a character database. These characters are made available at different prices or subscription rates based on criteria such as power, rarity, or importance to ongoing plot lines in the context of the game. The invention is made available via a plurality of networks to a plurality of players playing a plurality of games.

13 Claims, 7 Drawing Sheets

METHOD FOR PROVIDING CUSTOMIZED INTERACTIVE ENTERTAINMENT OVER A COMMUNICATIONS NETWORK

BACKGROUND OF THE INVENTION

1. Field of the Invention

The invention relates to on-line multiplayer computer games and particularly to games where a player takes on a defined role and involves a method for providing to the player the option to choose a customized character before playing the game.

2. Description of Prior Art

The popularity of computer games has grown in recent years due to the low cost of computers with powerful CPUs and plentiful Random Access Memory (RAM), the improved sophistication of computer graphics, and the availability of high-speed computer networks including the Internet.

COMPUTER GAMES—CLASSIFIED BY THEME

There are many types of computer games on the market today, and these games can be classified in several ways. The following list classifies popular computer game by theme.

Three-dimensional (3D) first-person action games, such as the "Doom" game produced by id Corporation, involve a 3D environment where a player's character can walk, turn, and react to the surrounding objects.

Adventure games and interactive fiction, such as the "Zork" game, involve stories in which a player controls a character in the game scenario.

Edutainment games, such as the "Where in the World is Carmen Sandiego" game produced by Broderbund, involve scenarios that attempt to provide both entertainment and education.

Fighting games, such as the "Mortal Kombat" game produced by Midway Manufacturing Company, involve martial arts and other fighting sports in an action-oriented setting. These games offer a variety of characters, each with a unique set of fighting skills, for a player to control.

Strategy games, such as the "SimCity" game made by Maxis Co. and the "ChessMaster" game produced by The Fidelity ToolWorks, involve a player managing the resources of a society.

Arcade-action games, such as the "1942" game, involve a player having to eliminate enemies using a setting such as war, alien invasion, or the like.

Simulation games, such as the "FA-18/Interceptor" game made by Electronic arts (EA), involve some form of military hardware such as aircraft or tanks. Other types of simulation games involve simulations such as racing a car or flying a spaceship.

Sports games, such as the "NBA live," "PGA Tour golf," and "NHL Hockey" games made by EA, involve simulations of actual sports such as baseball, hockey, football, or basketball.

War games, such as the "Eastern Front 1941" game made by Chris Crawford, involve a player having to adhere to a set of rules in a structured environment, such as a recreation of World War I or World War II.

A more complete and detailed description of the various game themes can be found in "The Ultimate Game Developer's Source book" by Ben Sawyer, ed. Coriolis Group Books, Inc., 1996.

COMPUTER GAMES—ROLE-PLAYING

A second way to classify computer games is to classify certain games as role-playing games. According to the Oxford English Dictionary, a Role-Playing Game (RPG) is "a game in which players take on the roles of imaginary characters, usually in a setting created by a referee, and thereby vicariously experience the imagined adventures of these characters." Certain 3D first-person action games, adventure games, fighting games, strategy games, and war games could be classified as RPGs.

In an RPG, a player accesses the game over a network and selects a character type such as race (e.g. human, elf, dwarf, or Klingon). Each character is further defined by its unique attributes. Attributes include, for example, statistics and skills. The player creates a character with various statistics such as strength, intelligence, or stamina. The player chooses skills for the character such as swordsmanship, spell casting, or swimming. Players then enter the virtual world and perform acts that give their characters experience, which the players can use to improve their character's skills and statistics. For example, by swimming in the game the character's swimming skill may improve, or by killing monsters the character may gain survival experience, advance in levels, and gain strength.

The definition of RPG can be described further in the context of the history of the development of RPGs.

In 1978, the first RPG was created by Roy Trubshaw and Richard Bartle, students at the University of Essex, England, as an experiment in shared memory techniques. Trubshaw and Bartle called their game a MUD ("Multi-User Dungeon"). It was a multi-user adventure game loosely based upon the popular game known as "Dungeons and Dragons." In this fantasy adventure, players were encouraged to compete with each other for points by going on quests to slay monsters or find treasure. All players started out on an equal footing, but after having accumulated a certain number of points, a player could advance his or her rank, thus gaining access to new and greater powers. This eventually lead to a sort of social hierarchy, starting with "Newbies" (new players at the lowest rank), continuing with various intermediate ranks, and culminating at the highest "Wizard" rank, with all the special powers and privileges of such rank.

Since Trubshaw and Bartle's original MUD, the term "MUD" has been used generically to describe a network-accessible, multi-participant, user-extensible virtual reality that is primarily text-based. Typically, the term "virtual reality" refers to computer-simulated environments, which possess varying degrees of audio/visual (AV) interface, and although some experimental MUDs do offer AV components, MUDs are generally text-based.

In the late 1970s, another RPG called "Island of Kesmai" (IOK) was created by John Taylor and Kelton Flinn, students at the University of Virginia. In 1982, Taylor and Flinn reached an agreement with online service provider CompuServe, which made "Island of Kesmai" and other games available to CompuServe subscribers for about $12/hour. Unlike the original MUD, IOK uses ASCII graphics. The game is grid-based, and players see a 6-by-6 bird's eye view matrix drawn using pairs of ASCII characters. Beginners have to select from various character classes and races (each of which has unique advantages and disadvantages), and characters are assigned six property values (strength, intelligence, dexterity, wisdom, stamina, and constitution). Players move their characters by typing in directions, and there are commands for characters to pick up, drop, examine, and throw objects.

In 1988, another online service provider, GEnie, began offering the game "Gemstone II" for $6/hour to GEnie subscribers.

In 1992, a MUD called "Genocide" was the first to allow one player to eliminate another player's character by way of the so-called "player-kill," for which a more descriptive name would be "character kill."

Also in 1992, id Software published "DOOM," a multiplayer game initially designed to be played on local area networks (LANs). DOOM was initially a shareware program, but it became so popular that players were willing to pay for additional development of the game. To date, an estimated 15 million copies of DOOM have been downloaded around the world, passed from player to player by floppy disk or online networks.

In 1995, id Software published "Quake," which was a multiplayer game designed to be played over the Internet. Quake employs a client-server model, where users download a client software program and then connect over the Internet to a game server.

Today's online role-playing game market in the United States is dominated by three games. (1) "Ultima Online," developed by Origin Systems and published in 1997 by Electronic Arts, currently has approximately 225,000 subscribers. (2) "EverQuest," developed by Verant and published in 1999 by Sony Online, currently has approximately 330,000 subscribers. (3) "Asheron's Call," developed by Turbine and published in 1999 by Microsoft, currently has approximately 100,000 subscribers. In Korea, "Lineage: The Blood Pledge," published in 1988 by NCsoft, currently has 2.7 million subscribers.

COMPUTER GAMES—MULTIPLAYER

A third way to classify computer games is according to the number of players that can play the game. There are single-player games, in which only one player is involved, and multiplayer games, in which a plurality of players is involved.

Ultima Online, Everquest, and Asheron's Call are also examples of what is commonly called a Massively Multi-player Online Role-Playing Game (MMORPG). Although there is no exact definition of what constitutes an MMORPG, today's MMORPGs can support hundreds and perhaps thousands or more of simultaneous players. MMORPGs use the client-server model, where users download client software programs and then connect over the Internet to a game server. According to Orgin Systems' web site, "[t]housands of game masters, counselors, interest volunteers and companions are in the [Ultima Online] game night and day . . . " According to Sony's web site, Everquest can support "well over 1,000 simultaneous players."

Much has been written about the economics of RPGs, including especially MMORPGs. Many financial models have been proposed. Using the "subscription" model, for example, an MMORPG publisher can realize $1 million/month in revenue if the publisher can attract 10,000 subscribers willing to pay $10/month. The subscription model is the primary model being used by MMORPG publishers today. Based on the $10/month/player subscription model, today's estimated 700,000 MMORPG subscribers pay approximately $84 million annually.

RELATED PUBLICATIONS

In "Online Entertainment Business Models Accommodate Distinctive Experiences," by Paul Palumbo, Gamasutra Vol. 1: Issue 18, Nov. 21, 1997, Palumbo discusses the advantages and disadvantages of online gaming business models, including advertising, subscription, pay-per-time, and pay-per-use models. In particular, Palumbo notes that the problem with the subscription model is that there may not be enough "light" users to subsidize "heavy" users who consume precious bandwidth.

In "Internet Business Models: New Options for Game Developers," by Ian MacInnes, Ph.D, Gamasutra, Jun. 5, 2000, MacInnes discusses the fact that certain MMORPGs accounts are being auctioned off by players on web-based auction sites such as eBay. This allows expert users to create accounts with advanced characters and then sell these accounts to other players. The player who purchases such an account can then continue to play the game with the advanced character and further develop the character. MacInnes suggests that there may not be enough buyers and sellers of such accounts to justify the creation of a dedicated market for such auctions.

In "Auctioning Away Integrity," by "SilentSpring," WomenGamers.Com, Aug. 4, 2000, SilentSpring laments the rise of the MMORPG account auction. SilentSpring states that she "does not like the idea of buying status in a game" and that she would rather play against "someone who paid [his or her] dues."

In "Next Generation MMORPGs: Economics 101," by Craig Huber, Multiplayer Online Games Directory, Oct. 10, 2000, Huber describes both the in-game and "real world" economics of online games. In terms of in-game economics, Huber notes that players expect to be rewarded for the time they spend playing a game by having their character accumulate skill and resources. In terms of "real world" economics, he notes that the thing that players value most is their time, and in order to motivate players to spend more time playing a particular game, that game's developers should work to normalize the "time cost" associated with accumulating certain skills and resources.

In "PlayerAuctions.com—Safe Haven for MMORPG Players?," by Sandy Brundage, studentadvantage.com, Nov. 11, 2000, Brundage notes that PlayerAuctions.com was launched as a dedicated web site for MMORPG auctions. Brundage points out that some MMORPG publishers ban players who participate in MMORPG auctions and that some publishers explicitly forbid the transfer, sale, or auction of MMROPG accounts, characters, or other items.

In "GameSpin: Volume 9," by Mark Asher, GameSpy.com, May, 1, 2001, Asher reports that one MMORPG developer indicated that the developer would have to achieve 50,000 subscribers at $10/month in order recover the costs of developing a new MMORPG.

In "Massive (Multiplayer) Entertainment," by Mark Asher, CG Online, Jul., 17, 2001, Asher discusses the history, present state, and future state of MMORPGs. Asher notes that there are hundreds of MMORPGs in development and that it remains to be seen how many of these will survive using a subscription model such as a monthly subscription fee.

RELATED PATENTS

In order to play current role-playing games, a player would generally have to purchase the client game software at a fixed price and also pay a subscription fee, usually about $10, per player account per month. Since every player pays the same price for the game account, every player receives the same set of playing options for the game.

Current MMORPGs plots are constrained by the economics of pricing models. If designers of MMORPGs do not improve their games, the games become comparatively less entertaining; and the developers risk losing subscribers. If developers do choose to improve their games, the developers must spend more time refining and developing their games, but then their companies become less profitable.

Furthermore, players do not have the ability to choose a predefined role in the current MMORPG environment. There is no RPG where a player can simply start to play and choose, for example, the role of Sheriff. In the existing games, a player must always start at a lower level and progress to the more advanced characters. A player might start, for example, as a Cowboy and progress over time to the position of Sheriff, but an individual cannot currently logon to a MMORPG, decide it would be fun to be the Sheriff, and play the role of Sheriff today.

Several U.S. patents have addressed issues relating to online gaming.

U.S. Pat. No. 5,885,156 to Toyohara et al. ("Toyohara"), Mar. 23, 1999, discloses a "Video game apparatus, method of controlling the growth of play character in video game, and video game medium therefor." Toyohara specifically addresses the issue of players losing interest in their characters in role-playing games. To solve this problem, Toyohara looks for ways to make the game more fun by allowing players to customize attributes of their characters within a game. However, Toyohara does not address a player purchasing a different role or a character with different attributes to renew the player's interest in the game.

U.S. Pat. No. 5,890,963 to Yen, Apr. 6, 1999, discloses a "System and method for maintaining continuous and progressive game play in a computer network." Yen relates to saving a character's state from one game and enabling the character to enter a new game environment or another instantiation of the same game environment. Yen does not address economic issues at all.

U.S. Pat. No. 6,009,458 to Hawkins et al., Dec. 28, 1999, discloses a "Networked computer game system with persistent playing object." Hawkins relates to persistent objects in the MMOPRG environment, but it does not touch on paying more or less for different entertainment experiences within the game.

U.S. Pat. No. 6,164,971 to Figart, Dec. 26, 2000, discloses "Historical event reenactment computer systems and methods permitting interactive role players to modify the history outcome." Figart proposes a computer-generated role-playing game for the teaching of history but deals only with historical subjects. There is no discussion of a player's involvement in a fictional scenario for the purpose of being entertained. Pricing and fee-for-service models are not mentioned at all.

U.S. Pat. No. 6,179,713 to James et al. ("James"), Jan. 30, 2001, discloses a full "Full-time turn based network multiplayer game." James discusses the advertising business model in particular, where players have to view advertising in exchange for game currency. James also discusses how supply and demand principles can be applied during a game to raise or lower the in-game cost of certain game resources. The problem with the James dynamic pricing mechanism is that it only applies to players that are already playing the game. James makes no mention of pricing options available to player before they being playing.

Therefore, what is needed is a way for RPG publishers to make their games more compelling to players in an increasingly crowded RPG game market, and what is needed is a way for players to be able to choose different levels or ranks of roles or characters in an online gaming environment.

SUMMARY OF THE INVENTION

Objects

The invention applies to games, to online games, to RPG games, and to MMORPGs, and the terms "games," "online games," "RPGs," and "MMORPGs" are often used interchangeably. Similarly, the terms "game publisher," "RPG publisher," and "MMORPG publisher" are often used interchangeably.

One object of the invention is to provide a way for RPG publishers, and MMORPG publishers in particular, to attract new players to their games in an increasingly crowded RPG market.

A further object of the invention is to provide a way for RPG publishers, and MMORPG publishers in particular, to retain existing players of their games in an increasingly crowded RPG game market.

A further object of the invention is to provide a way for MMORPG publishers to attract new players and retain existing players without necessarily having to spend time and money developing and refining their games.

A further object of the invention is to provide a way for players to be able to choose different levels or ranks of roles or characters in an online gaming environment.

A further object of the invention is to provide a way for players to be able to choose intermediate or advances levels or ranks of roles or characters at the start of a game without having to start at a beginning or novice level or rank.

A further object of the invention is to provide a way for players to be able to save characters for future use or resale.

Features

The invention makes it possible for MMORPG publishers to attract players to their new and existing games in an increasingly crowded MMORPG market. The invention also makes it possible for MMORPG publishers to retain existing players of their games. The invention makes it possible for MMORPG publishers to attract new players and retain existing players without necessarily having to spend time and money developing and refining their games.

Currently, when players sign up for an online game, they are charged a flat monthly fee under a subscription model. In return, players get a limited set of game options that are the same as those of every other starting player. A limitation of the flat rate pricing is that all players have essentially the same choices in the game.

The invention overcomes the limitations of the existing model and attains the stated objectives by providing a plurality of databases that store information about games, game players, characters, and character attributes. The terms "characters" and "roles" are used interchangeably to in the context of the invention. Players can now interact with the game and other players in ways that have not been possible before the invention. Within a particular RPG, players now have more choices of characters and character attributes. It is possible for character attributes to include any variables that can be part of a game's plot or setting. Character attributes can include statistics; such as strength, intelligence, or stamina; skills, such as swordsmanship, spell casting, or swimming; and other attributes; such as location in time and space of the character in the plot of a game.

Furthermore, the character database can include predefined characters, characters created by players that have already played a particular game, or characters created in real time by new players. In one embodiment of the invention, the character database would reside on a central database server. In another embodiment of the invention, the character database resides on a storage medium such as a CD-ROM or floppy disk.

Just as people today can vicariously participate in interesting plots involving great characters with dramatic roles by watching plays or television dramas, with this invention players can join an MMORPG where they are the great character with the dramatic role in an interesting plot. This invention blurs the line between audience and actor, between game and drama.

The invention benefits both the producers and consumers (players) of MMORPGs. Producers now have an incentive to offer, directly or in an affiliate relationship with a third party, more choices to players, in the same way the airlines offer different classes of service to passengers. With an essentially infinite combination of characters and character attributes available to them, players are now to play games in many new and different ways. In this way, the invention is an improvement to existing account auctions, where only a handful of characters are available to players.

A preferred embodiment of the present invention would include a game server and a plurality of game clients. The game server would house the game software and would be connected to a network such as a LAN or the Internet and would be connected to a plurality of game clients. The game client is a computer or other game-playing device running the game client software and having a connection to the game server via the network. The client software could be delivered in many different ways, such as over the network, or via postal mail on a CD-ROM, or via other retail channels such as stores.

A preferred embodiment of the present invention would include a starting screen giving a player the choice between playing a game with an existing character purchased previously, creating a new character not requiring a purchase, or purchasing a character. Players make character choices based on a variety of factors, including, but not limited to, how much time players have to play a game, which characters and attributes the players desire, and how much players are willing to pay. If the player chooses the option of purchasing a character, the player will move on to a screen, which gives the player several methods for defining a character with the attributes the player considers desirable.

The invention enables players to purchase characters purchased directly, and the invention also enables players to purchase subscriptions that provide access to a specified range or characters. For example, players who purchase a "silver" subscription can access lower rank characters such as guards and regulars, and players who purchase a "gold" subscription can include access higher rank characters such as to generals or ship captains. Players' subscription data is stored in a subscription type database. Alternatively, players can purchase points instead of subscriptions, and the points can be exchanged for characters.

Characters can be purchased for immediate use, can be set aside to purchase at a later date, or can be already purchased but unusable. Characters can be unusable, for example, when a defined time period for using a character expires, when a defined period for using a character has not yet occurred, or when a subplot expires or has not yet occurred.

With many combinations of characters and character attributes possible, there are also many possible ways to search or browse for particular characters. When a player is defining a new character or searching for an existing character, several ways of organizing the character data are possible.

The methods for organizing character data include, but are not limited to:

Organizing characters in a hierarchical list so that players can choose characters of higher or lower rank, as the player desires. For example, in a military game, a character of general would have a higher rank than a character of major.

Organizing characters by attribute so that players can search or browse for the desired attributes.

Organizing characters by types so that players can find characters of a particular type such as princes, paupers, Algonquins, or Zulus.

Organizing characters by geography of the game so that players can search or browse for characters in a particular location such as Japan, Shangri-La, Narnia, or Middle Earth.

After a player has entered the desired criteria, the search engine will query the character database and will display a results page showing the available characters that fall within the specified criteria. The results page will show the player the characters available, a brief description of the character, the attributes and limitations of the character, a plot summary of the character providing context and goals for the character, and a price for the purchase of the character.

The player can then either purchase the selected character from those or initiate another search. If the player chooses to complete the purchase, the player will be given a code, which is also a unique character identification number, to enter when he or she begins to play. The player will also have the option to save the code within the game so that the new character will appear on the player's character menu when the player begins play of the game. This code provides an added level of security for the player, making it more likely that only the player will have access to the player's characters.

Advantages

From the description above a number of advantages of the invention become apparent. This invention:

Provides a way for RPG publishers, and MMORPG publishers in particular, to attract new players to their games in an increasingly crowded RPG market.

Provides a way for RPG publishers, and MMORPG publishers in particular, to retain existing players of their games in an increasingly crowded RPG game market.

Provides a way for MMORPG publishers to attract new players and retain existing players without necessarily having to spend time and money developing and refining their games.

Provides a way for players to be able to choose different levels or ranks of roles or characters in an online gaming environment.

Provides a way for players to be able to choose intermediate or advanced levels or ranks of roles or characters at the start of a game without having to start at a beginning or novice level or rank.

Provides a way for players to be able to save characters for future use or resale.

The above and other objects, features, and advantages of the invention are best understood when read in context with the following description, drawings, and claims.

DETAILED DESCRIPTION OF THE PREFERRED EMBODIMENT OF THE INVENTION

Figure 1:
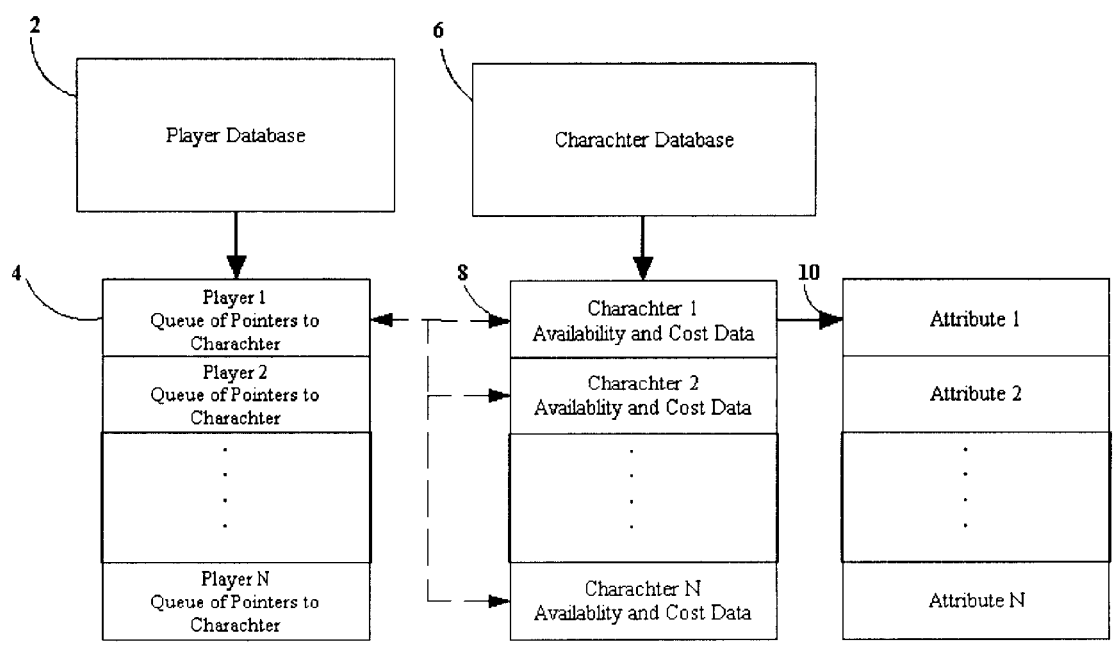
FIG. 1 is an illustration of how data for characters and players will be stored and interconnected.

Referring now to FIG. 1, player database and character database and interconnection. A player database 2 stores data relating to players for the related game or set of games. Each player has a corresponding player record 4 in the player database containing data such as player names, credit card numbers, addresses, phone numbers, e-mail address, and subscription types.

Continuing now with FIG. 1. A character database 6 stores data relating to characters for the related game or set of games. Each character has a corresponding character record 8 containing data such as character availability, description, location, position, rank, title, cost of the character in points, cost of the data character in game currency, and cost of the character in real-word currency. Each character record includes a list of character attributes 10 that each character has including character statistics, character skills, and other character attributes. Each player record includes a queue of pointers to the character records corresponding to the characters that the player has purchased, has set aside to purchase, and has purchased but can no longer use.

Figure 5:
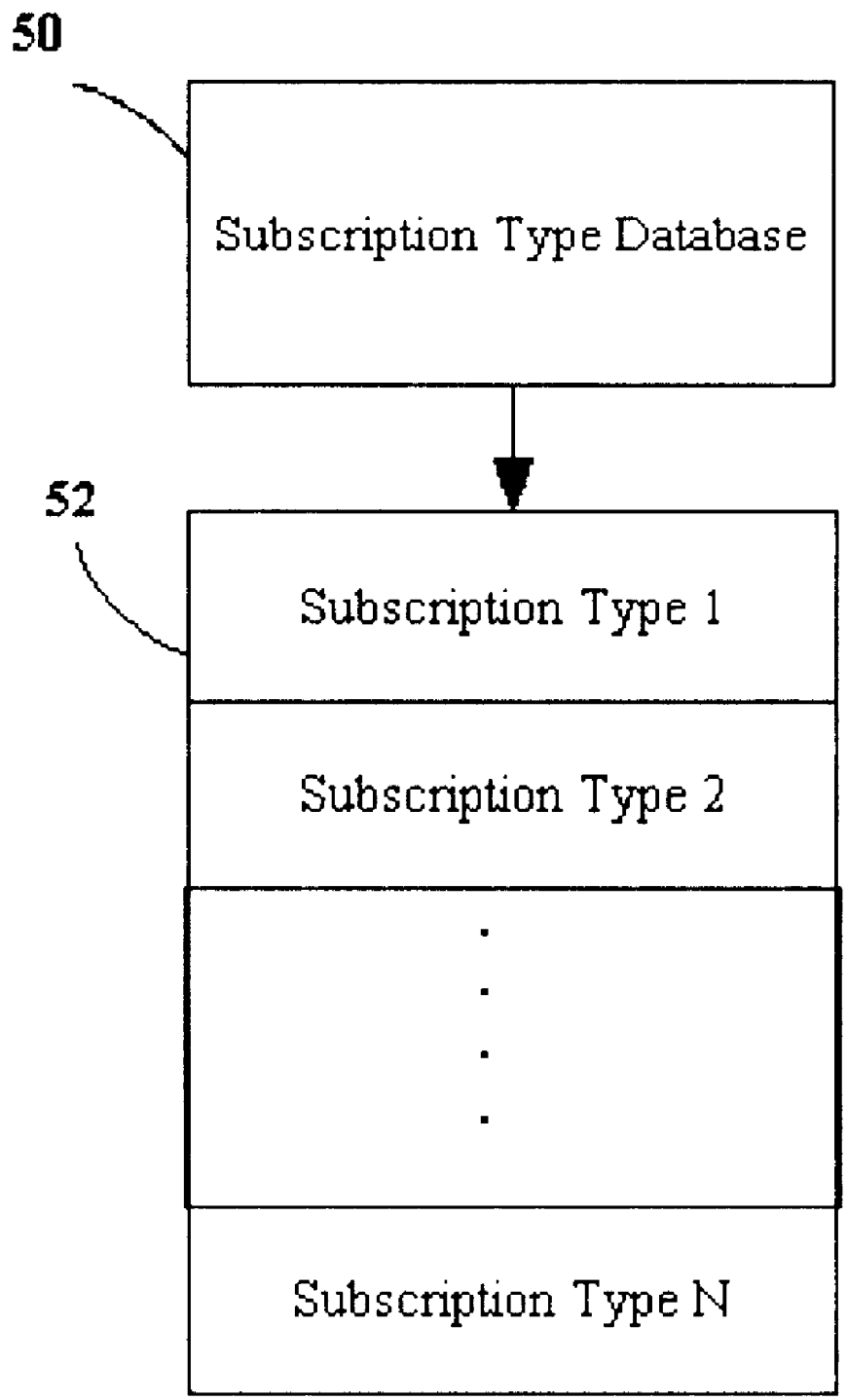
FIG. 5 is an illustration of how data for subscription types will be stored.

Referring now to FIG. 5, subscription types database. The player database 2 of FIG. 1 includes a subscription types database 50. Continuing now with FIG. 5. The subscription types database 50 stores data relating to subscriptions for the related game or set of games. Each subscription has a corresponding subscription types record 52 containing data such as the number of points a player has left to use and the number of non-subscription points, or game currency a player has purchased. Subscription types are worth a set number of points that can be used towards purchasing characters. If a player does not have enough points to complete a purchase, the player will have to buy more points or a larger subscription to be able to buy more characters during that month.

Figure 2:
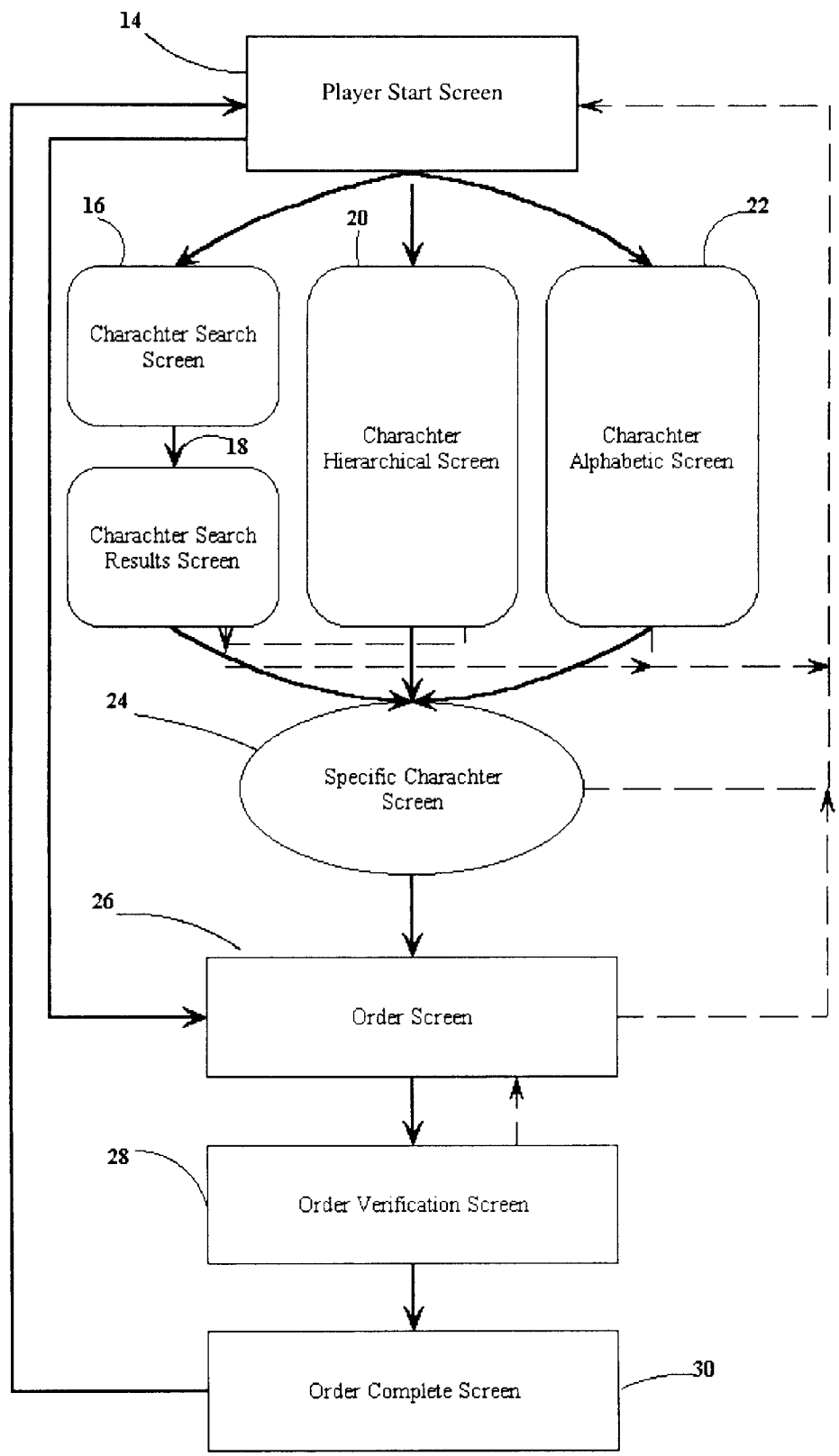
FIG. 2 is an illustration of how a player orders characters. The screens will be accessible via web, the game, and the game system. The screens will have the same fields and functions but will look different due to the media's differences.

Referring now to FIG. 2, players ordering characters. A player start screen 14 is displayed to a player. From the player start screen 14, the player chooses from several options including searching for characters, browsing a list of characters organized by hierarchy, browsing a list of characters organized alphabetically, and ordering/checking-out. If the player chooses to search for characters, a character search screen 16 is displayed. If the player chooses to browse a list of characters organized by hierarchy, a character hierarchical screen 20 is displayed. If the player chooses to browse a list of characters organized alphabetically, a character alphabetic screen 22 is displayed.

From the character search screen 16, the player will be able to search the character database 6 based on a character's type, rank, name, position, title, geographic location, availability, description, and cost. Once the player has submitted the search, a character search results screen 18 will be displayed. The character search results screen 18 displays the most relevant matches to the player's character search. When the player selects a character from the character results screen 18, a specific character screen 24 is displayed. The specific character screen 24 lists information including character availability, description, location, position, rank, title, cost of the character in points, cost of the data character in game currency, and cost of the character in real-word currency. From the specific character screen, the player can then either select a specific character, in which case an order screen 26 is displayed, or the player can return to the player start screen 14.

The character hierarchical screen 20 lists characters in order of their rank. For example, in a military game, a character of general would have a higher rank than a character of major. When the player selects a character from the character hierarchical screen 20, the specific character screen 24 is displayed. The specific character screen 24 lists information including character availability, description, location, position, rank, title, cost of the character in points, cost of the data character in game currency, and cost of the character in real-word currency. From the specific character screen, the player can then either select a specific character, in which case an order screen 26 is displayed, or the player can return to the player start screen 14.

The character alphabetic screen 22 lists characters alphabetically. When the player selects a character from the character alphabetic screen 22, the specific character screen 24 is displayed. The specific character screen 24 lists information including character availability, description, location, position, rank, title, cost of the character in points, cost of the data character in game currency, and cost of the character in real-word currency. From the specific character screen, the player can then either select a specific character, in which case an order screen 26 is displayed, or the player can return to the player start screen 14.

From the order screen 26, the player enters payment information. Payment can be made using pints, gamer currency, or real-world currency. When the player enters an order from the order screen 26, an order verification screen 28 is displayed. From the order verification screen 28, the player can return to the order screen 26 to modify or correct the order or the player can confirm the order, in which an order complete screen 30 is displayed. The order complete screen 30 displays a notice that the order has been taken and displays a unique order confirmation number. After a predetermined period of time or when the player chooses, the player start screen 14 will again be displayed.

Figure 3:
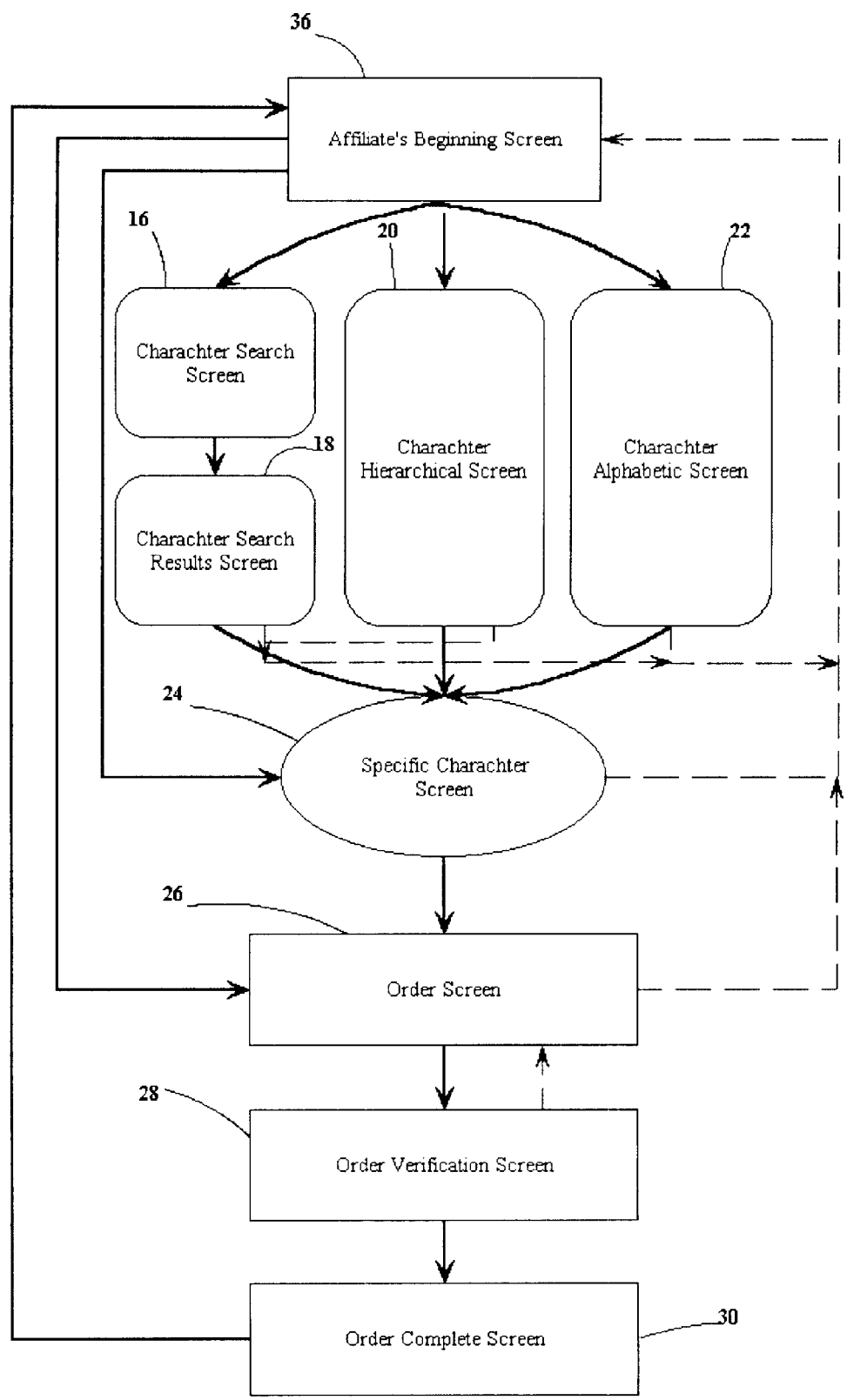
FIG. 3 is an illustration of how an affiliate buys characters. The screens will be accessible via web, the game, and the game system. The screens will have the same fields and functions but will look different due to the media's differences.

Referring now to FIG. 3, affiliates ordering characters. FIG. 3 is identical to FIG. 2 with the exception that in FIG. 3., an affiliate's beginning screen 36 includes the ability to go directly to the specific character screen 24. The affiliate's beginning screen 36 is used by affiliate stores and by customer service and allows an affiliate to directly enter a character's code, which is also a unique character identification number, use a bar code scanner to identify a character by the character's code, or to find a character through the same method players use, namely searching or browsing. This allows, for example, a parent to purchase a game character at a store for a child. From the affiliate's beginning screen 36, an affiliate can also enter store identification and sales representatives' names.

Figure 4:
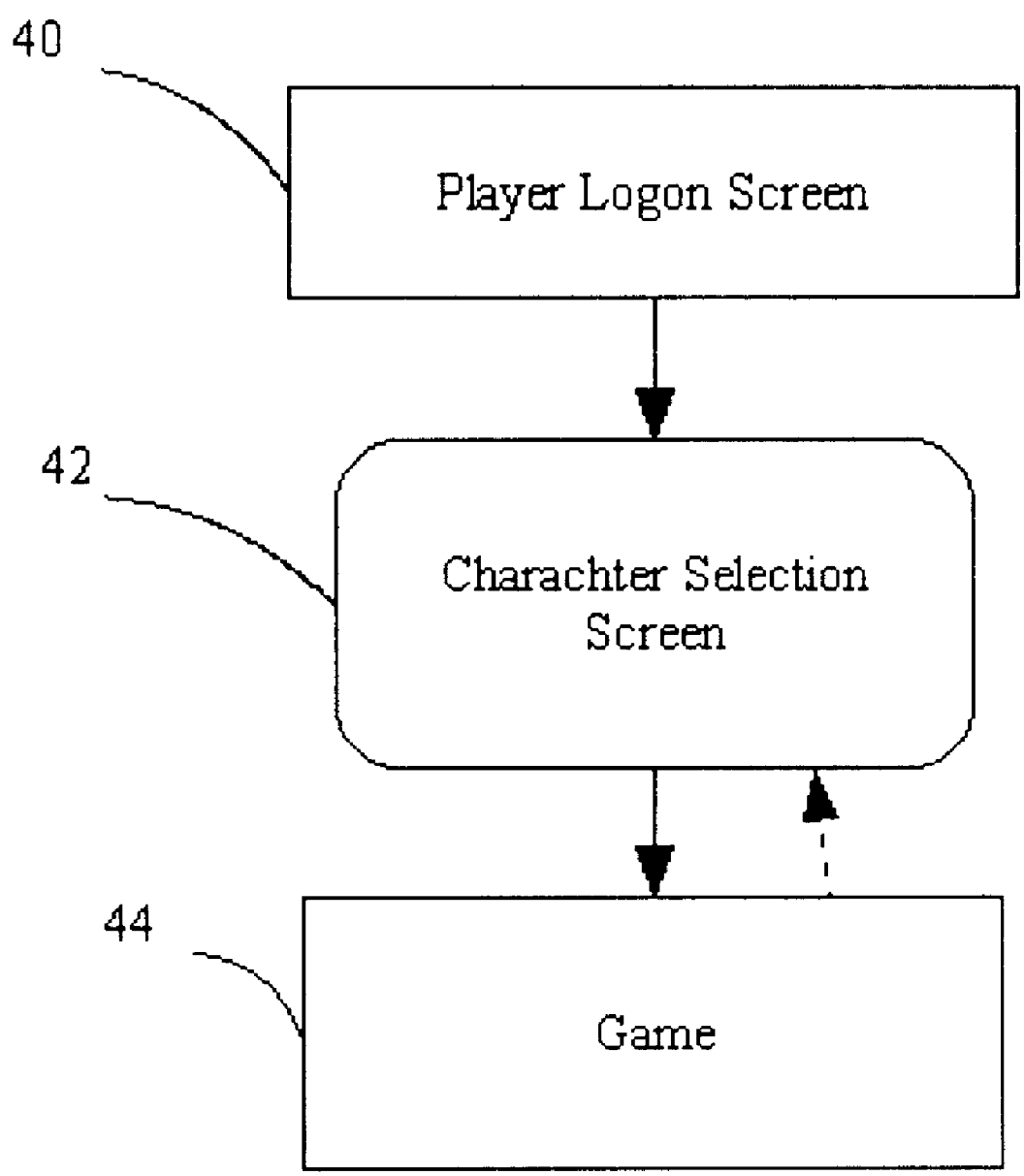
FIG. 4 is an illustration of how a player enters a game.

Referring now to FIG. 4, player logon. A player logon screen 40 prompts the player to enter the player's username and password. Once the player enters a valid username and password pair, a character selection screen 42 is displayed. From the character selection screen 42, the player will select the his or her purchased characters corresponding to character records 8 of FIG. 1. Once the player has chosen a character, the player will begin playing a game 44.

Figure 6:
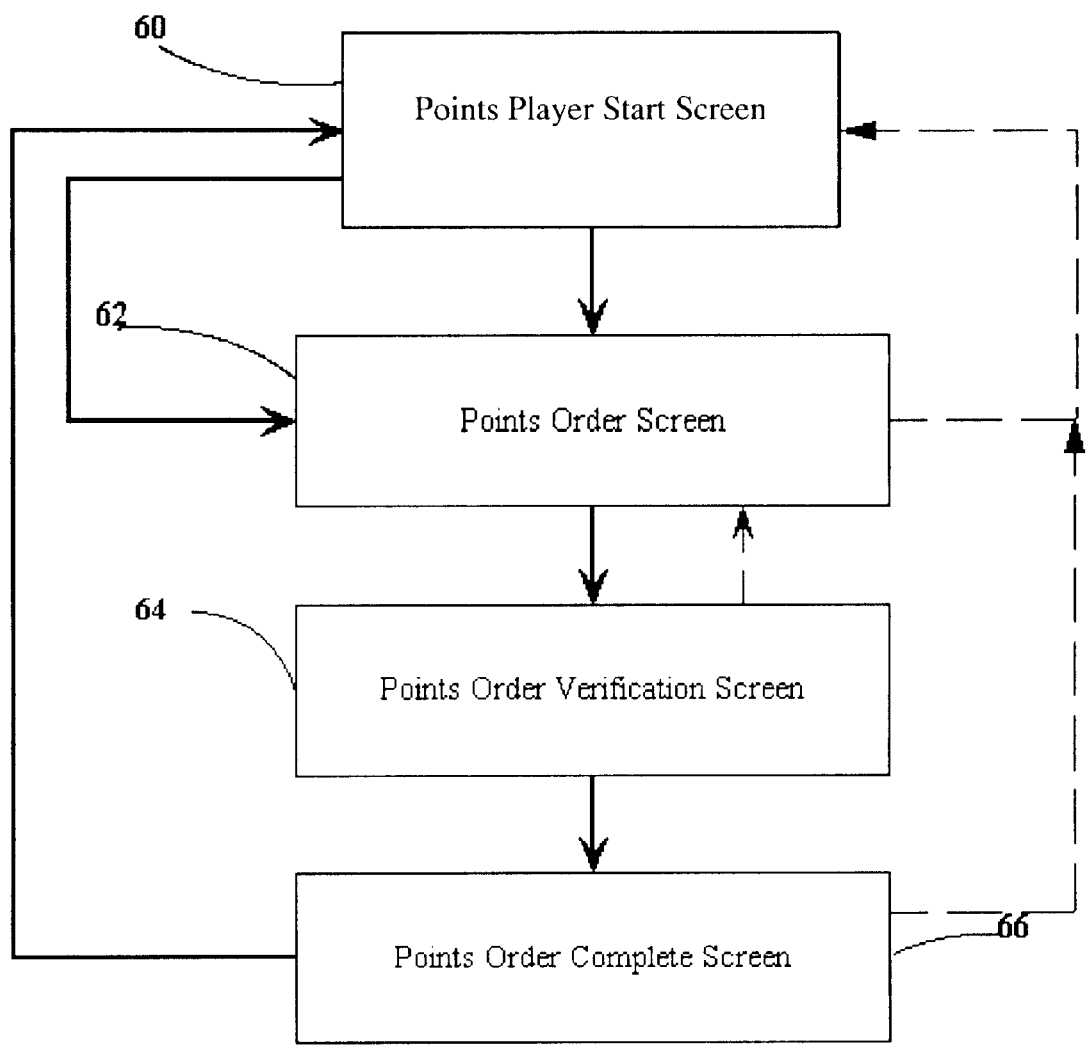
FIG. 6 is an illustration how players purchase points.

Referring now to FIG. 6, purchasing points. A points player start screen 60 is displayed to a player. Next, a points order screen 62 is displayed. From the points order screen 62, the player will enter the desired amount of points, which are used for buying characters. A points order verification screen 64 gives the player the opportunity to review and correct the player's order and payment information. From the points order verification screen 64, the player can choose to complete the order, in which case a points order complete screen 66 is displayed. The points order complete screen 66 displays a notice that the order has been taken and displays a unique order confirmation number. After a predetermined period of time or when the player chooses, the points player start screen 60 will again be displayed.

Figure 7:
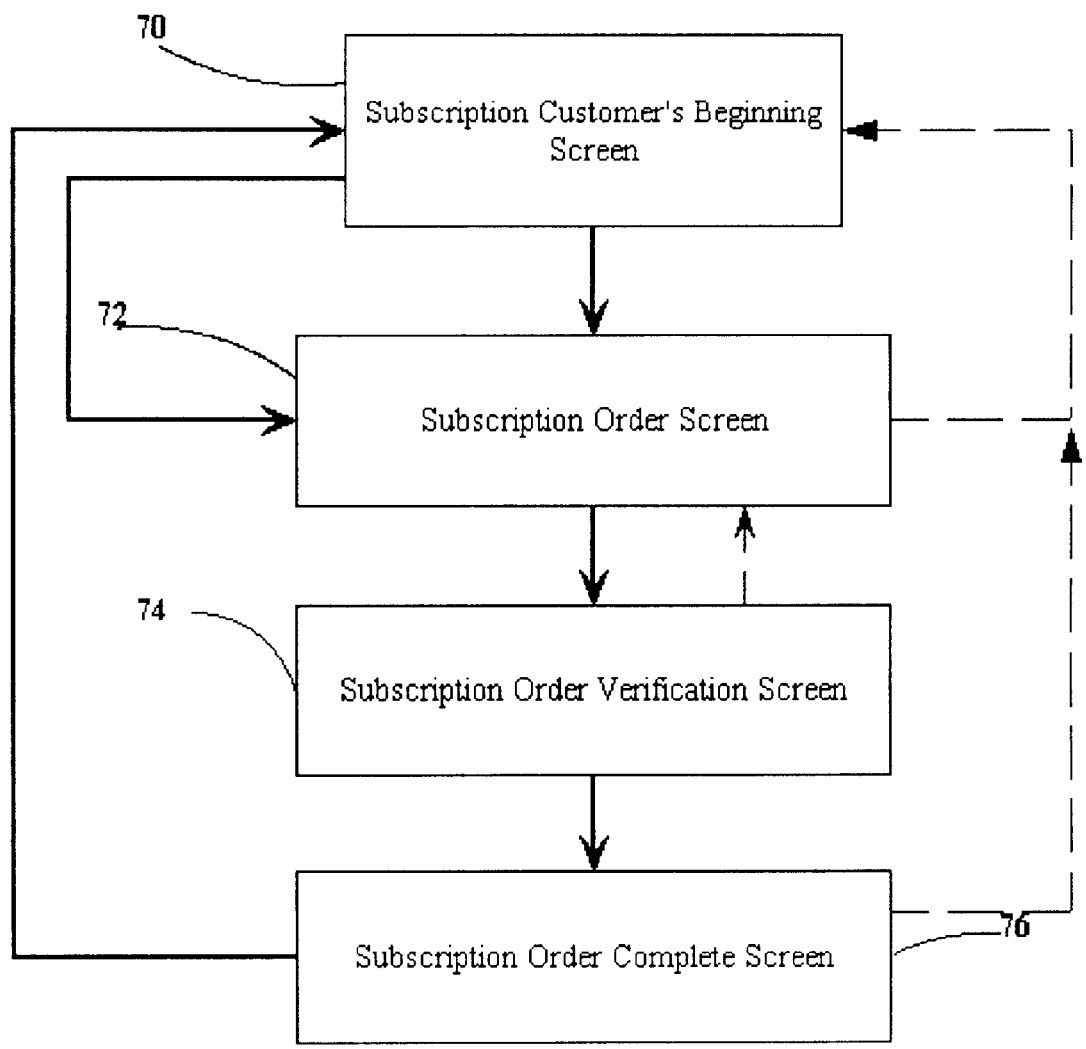
FIG. 7 is an illustration how players purchase subscriptions.

Referring now to FIG. 7, purchasing subscriptions. A subscription player start screen 70 is displayed to a player. Next, a subscription order screen 72 is displayed. From the subscription order screen 72, the player will enter the desired subscription type. A subscription order verification screen 74 gives the player the opportunity to review and correct the player's order and payment information. From the subscription order verification screen 74, the player can choose to complete the order, in which case a subscription order complete screen 76 is displayed. The subscription order complete screen 76 displays a notice that the order has been taken and displays a unique order confirmation number. After a predetermined period of time or when the player chooses, the points player start screen 70 will again be displayed.

What is claimed is:

1. A method for providing customized interactive entertainment to a player, said method comprising:

providing a First Database for storing information about a plurality of Players;

providing a Player Selection Means for selecting a Player from said plurality of Players;

providing a Second Database for storing information about a plurality of predefined Roles within a plot of a game;

providing a Role Selection Means for selecting a Role from said plurality of predefined Roles; and providing an Order Interface Means for ordering a Role from said plurality of predefined Roles.

2. The method of claim 1, wherein said Role Selection Means comprises:

providing a Role Browsing Means for selecting a Role from a plurality of ordered lists of Roles; and providing a Role Searching Means for searching for Roles from said second database.

3. The method of claim 2 wherein said Role Selection Means is operable to browse and search by attributes and variables associated with each Role.

4. The method of claim 3 wherein said attributes and variables include statistics, skills, limitations, rank, name, title, cost, availability, description, and location in time and space.

5. A method for providing customized interactive entertainment to a player, said method comprising:

providing a First Database for storing information about a plurality of Players;

providing a Player Selection Means for selecting a Player from said plurality of Players;

providing a Second Database for storing information about a plurality of Subscription Types;

providing a Subscription Selection Means for selecting a Subscription Type from said plurality of Subscription Types;

providing a Third Database for storing information about a plurality of predefined Roles within a plot of a game;

providing a Role Selection Means for selecting a Role from said plurality of predefined Roles; and providing an Order Interface Means for ordering a Role from said plurality of predefined Roles.

6. The method of claim 5, wherein said Role Selection Means comprises:

providing a Role Browsing Means for selecting a Role from a plurality of ordered lists of Roles; and providing a Role Searching Means for searching for Roles from said second database.

7. The method of claim 6 wherein said Role Selection Means is operable to browse and search by attributes and variables associated with each Role.

8. The method of claim 7 wherein said attributes and variables include statistics, skills, limitations, rank, name, title, cost, availability, description, and location in time and space.

9. A method of providing a multiplayer, online, game, said method comprising:

providing a First Database for storing information about a plurality of Players;

providing a Player Selection Means for selecting a Player from said plurality of Players;

providing a Second Database for storing information about a plurality of predefined Roles within a plot of said game;

providing a Role Selection Means for selecting a Role from said plurality of predefined Roles; and providing an Order Interface Means for ordering a Role from said plurality of predefined Roles.

10. The method of claim 9, wherein said Role Selection Means comprises:

providing a Role Browsing Means for selecting a Role from a plurality of ordered lists of Roles; and providing a Role Searching Means for searching for Roles from said Second Database.

11. The method of claim 10 wherein said Role Selection Means is operable to browse and search by attributes and variables associated with each Role.

12. The method of claim 11 wherein said attributes and variables include statistics, skills, limitations, rank, name, title, cost, availability, description, and location in time and space.

13. A method for providing customized interactive entertainment over a communications network, said method comprising:

providing a multiplayer online game with a predefined plot;

providing a First Database for storing information about a plurality of Players;

providing a Player Selection Means for selecting a Player from said plurality of Players;

providing a Second Database for storing information about a plurality of pre-existing Roles with a place in a plot of a game; and providing a Role Selection Means for selecting a Role from said plurality of predefined Roles, said Role Selection Means comprising:
  providing a Role Browsing Means for selecting a Role from a plurality of ordered lists of Roles; and
  providing a Role Searching Means for searching for Roles from said Second Database, wherein said Role Selection Means is operable to browse and search by attributes and variables associated with each Role, said attributes and variables including statistics, skills, limitations, rank, name, title, cost, availability, description, and location in time and space; and providing an Order Interface Means for ordering a Role from said plurality of Roles.

* * * * *